(12) United States Patent
Bates et al.

(10) Patent No.: US 7,089,535 B2
(45) Date of Patent: Aug. 8, 2006

(54) CODE COVERAGE WITH AN INTEGRATED DEVELOPMENT ENVIRONMENT

(75) Inventors: Cary Lee Bates, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 549 days.

(21) Appl. No.: 10/108,681

(22) Filed: Mar. 28, 2002

(65) Prior Publication Data
US 2003/0188301 A1 Oct. 2, 2003

(51) Int. Cl.
*G06F 9/44* (2006.01)
*G06F 9/45* (2006.01)

(52) U.S. Cl. .................. 717/130; 717/131; 717/158

(58) Field of Classification Search ............. 717/158, 717/138, 100, 121, 151, 130, 114, 125
See application file for complete search history.

(56) References Cited

U.S. PATENT DOCUMENTS 5,752,038 A * 5/1998 Blake et al. .............. 717/158
6,256,773 B1 * 7/2001 Bowman-Amuah ......... 717/121
2002/0016953 A1 * 2/2002 Sollich ....................... 717/1

OTHER PUBLICATIONS

"Our First-Generation Dynamic Compilation System", by University of Washington, "www.cs.washington.edu/research/dyncomp/Prototype".*

* cited by examiner

*Primary Examiner*—Wei Zhen
*Assistant Examiner*—Chih-Ching Chow
(74) *Attorney, Agent, or Firm*—Paterson & Sheridan, LLP

(57) ABSTRACT

A method, apparatus and article of manufacture for collecting coverage data. In one embodiment, a method is provided for collecting coverage data for a code portion which, when compiled and linked, becomes a module of a program. The method comprises configuring the code portion settings such that when the module is instrumented coverage data will be gathered for the module; and instrumenting the code portion according to the settings and only for those statements for which no coverage data exists. Coverage data can then be collected, for example, each instance the module is executed, each instance the module is executed as part of a particular program, or each instance the module is executed by a particular user.

22 Claims, 10 Drawing Sheets

Part Information 200

| Name | Checked Out | Coverage | Groups | PGMS | Users |
|---|---|---|---|---|---|
| testfoo | Bates | y | y | all | all |

CODE COVERAGE WITH AN INTEGRATED DEVELOPMENT ENVIRONMENT

BACKGROUND OF THE INVENTION

1. Field of the Invention

The present invention generally relates to data processing and more particularly to gathering coverage data for program code.

2. Description of the Related Art

Development of software requires frequent testing and debugging. One aspect of testing is collecting coverage data. Coverage data includes a variety of statistics for the program being tested. Today, coverage data is often collected by code coverage tools which identify which statements of a program being tested have been executed. Utilizing code coverage tools requires a user to instrument their program first and then collect coverage data while running the various tests. Instrumentation involves replacing opcodes at the beginning of each statement such that when the statement is executed a trap occurs. The code coverage tool catches the trap and notes that the statement has been covered by marking it as such in a data file.

One disadvantage of the foregoing approach is that code coverage is performed for an entire program, rather than a particular piece of code. Thus, a user must collect coverage data for each program containing a particular piece of code, even though the user is interested only in that particular piece of code.

The disadvantages of the foregoing approach are even greater in a multiuser software development environment. Specifically, while coverage data may be collected for each of the various developers of a particular team of developers, a comprehensive picture of what code has been covered by the team is not possible. Though some code coverage tools do allow developers to merge coverage data from several runs, this is a time-consuming process. Also, merging coverage data does nothing to reduce the instrumentation burden since the programs must be fully instrumented every time coverage data is to be collected. Further, isolating the use of shared library routines and obtaining associated coverage data can be difficult, especially when the routines are bound to various test programs. Using conventional code coverage tools, obtaining coverage data for such shared library routines requires that each user of the development team collect and merge coverage data each time a program is run and further requires that the merged coverage data for each user is merged with the coverage data collected by the other users of the development team.

Therefore, there is a need for a system and method which allows for collecting coverage data in a manner which overcomes the foregoing disadvantages.

SUMMARY OF THE INVENTION

The present invention generally provides a method, apparatus and article of manufacture for collecting coverage data.

One embodiment provides a method comprising storing user input code portion information for a code portion which, when compiled and linked, becomes a module of a program; and compiling the code portion to generate an object; wherein the object is configured with instrumentation settings during compiling such that when the module is instrumented coverage data will be gathered for the module when the program is run.

Another embodiment provides a method for collecting coverage data for a code portion which, when compiled and linked, becomes a module of a program. The method comprises configuring the code portion settings such that when the module is instrumented coverage data will be gathered for the module; and instrumenting the code portion according to the settings and only for those statements for which no coverage data exists. Coverage data can then be collected, for example, each instance the module is executed, each instance the module is executed as part of a particular program, or each instance the module is executed by a particular user.

Still another embodiment provides computer readable mediums containing program which, when executed performs either of the methods described above.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a data structure containing part information;

DETAILED DESCRIPTION OF THE PREFERRED EMBODIMENTS

The present invention generally provides a method, apparatus and article of manufacture for collecting coverage data for a code entity. In one embodiment, a program or a particular piece of code is flagged, or otherwise marked, such that coverage data will be gathered for this code entity as it is used.

One embodiment of the invention is implemented as a program product for use with a computer system such as, for example, the computing environment shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
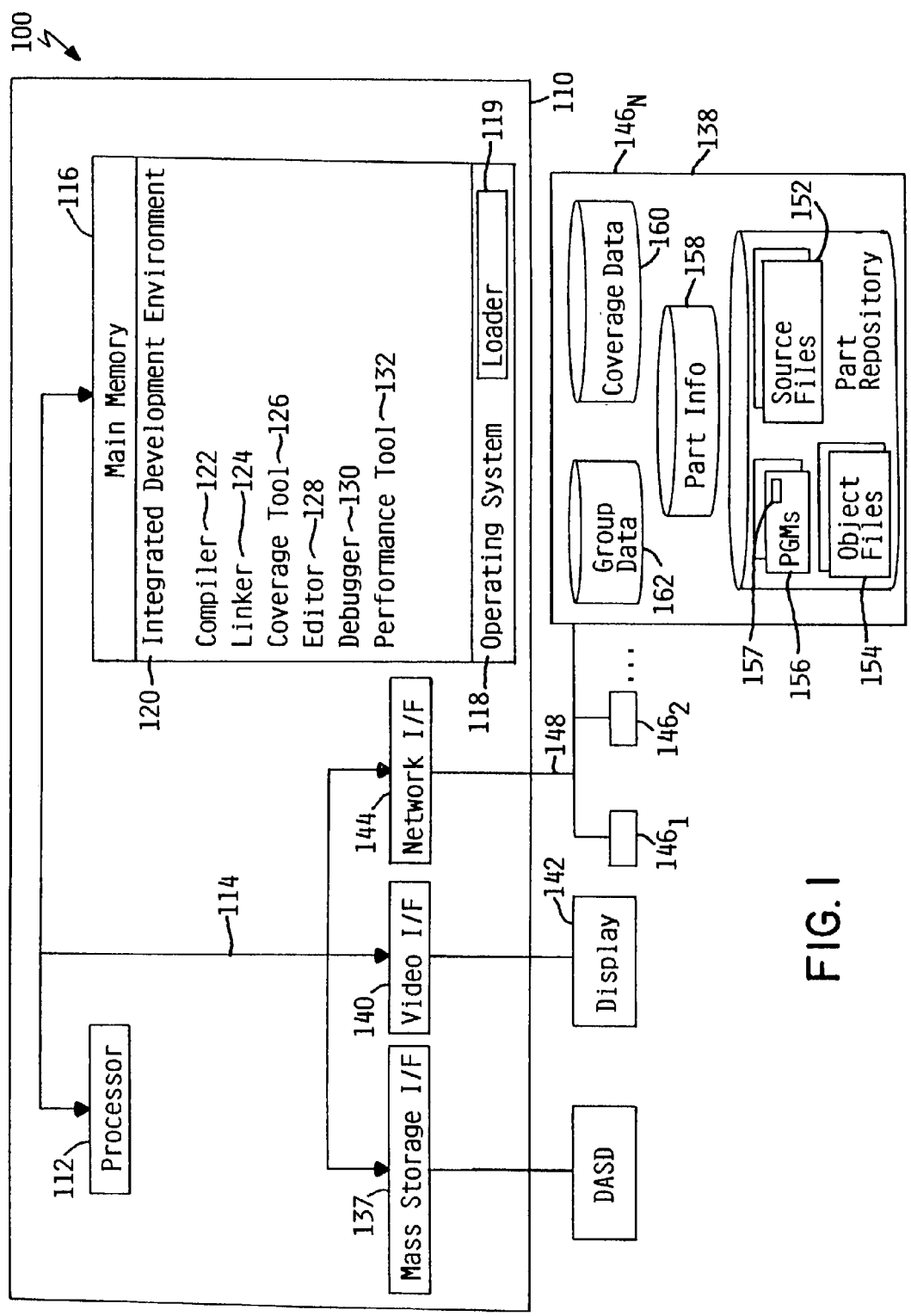
FIG. 1 is a high level diagram of a computer system of the present invention.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods of the invention. In particular, the computer processor 112 is selected to support the features of the present invention. Illustratively, the processor is a PowerPC processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

As shown, The main memory 116 generally includes an operating system 118 and an integrated development environment (IDE) 120. The operating system 118 may be any suitable operating system, such as the Linux® operating system, which includes a loader 119 for loading programs into memory. The IDE 120 comprises a compiler 122, a linker 124, a coverage tool 126. an editor 128, a debugger 130 and a performance tool 132. The compiler 122 is configured for translating source code (in source code files 152) into machine code (in the form of object code files 154) and the linker 124 is configured to link the machine code together to form a program (represented by programs 156). In the illustrative embodiment, the source code files 152, object code files 154 and the resulting programs 156 are located in a parts repository 150 residing on a remote computer $146_N$ and accessed by the computer 110 via a network connection 148. During compilation of the source code contained in the source code flies 152, the compiler 122 implements various options used in gathering coverage data for the source code. During runtime, coverage data is then collected according to the implemented compiler options and stored In a coverage data database 160 residing on the remote computer $146_N$ In one embodiment, whether coverage data will be collected for a particular code portion is indicated in a part information database 158. The coverage tool 126 is utilized by a user to indicate which statements of a program module (of the programs 156) have not been covered (i.e., those statements for which no coverage data has been collected and stored in the coverage data database 160). Embodiments of the part information database 158 and the coverage data database 160 will be described below with reference to FIG. 2 and FIG. 3, respectively.

In some embodiments, collection of coverage data for some particular code is dependent upon whether the user executing the code is a member of a group. A group may comprise any defined combination of two or more users. The defined groups are stored in a group database 162.

It should be understood that the IDE 120 shown in FIG. 1 is merely illustrative. In other embodiments, the IDE 120 may include more or less components than as shown in FIG. 1. Further, embodiments of the invention are not limited to integrated development environments and are merely described as such for purposes of illustration.

Referring now to FIG. 2, an embodiment of a table 200 contained in the part information database 158 is shown. In general, the table 200 is arranged as a plurality of columns and rows, where each column defines a field category and each row defines a record (only one record is shown for simplicity). Illustratively, the table 200 comprises a name column 202, a checkout column 204, a coverage column 206, a groups column 208, a programs column 210 and a users column 212. Each record entry in the name column 202 contains a part name. As defined herein, a part is a file used to create a program. As such, a part may be source code, data or any other information used in creating a program. In general, a part is either checked out or checked in. A checked out part is one which is in the exclusive use of a particular user. Accordingly, when a part is checked out the appropriate user name is indicated in the checkout column 204. The entries under the coverage column 206 are flag fields which indicate whether coverage data will be collected for a particular part. The group column 206 contains flag fields which indicate whether coverage data is to be collected according to user groups (as specified in the group data database 112). The entries under the program column 210 indicate which programs coverage data is to be collected for. Thus, coverage data for a part will only be collected for those instances of the part in the programs specified in the associated entry of the program column 210. Finally, the entries under the user column 212 indicate the users for which coverage data will be collected for a particular part.

Figure 3:
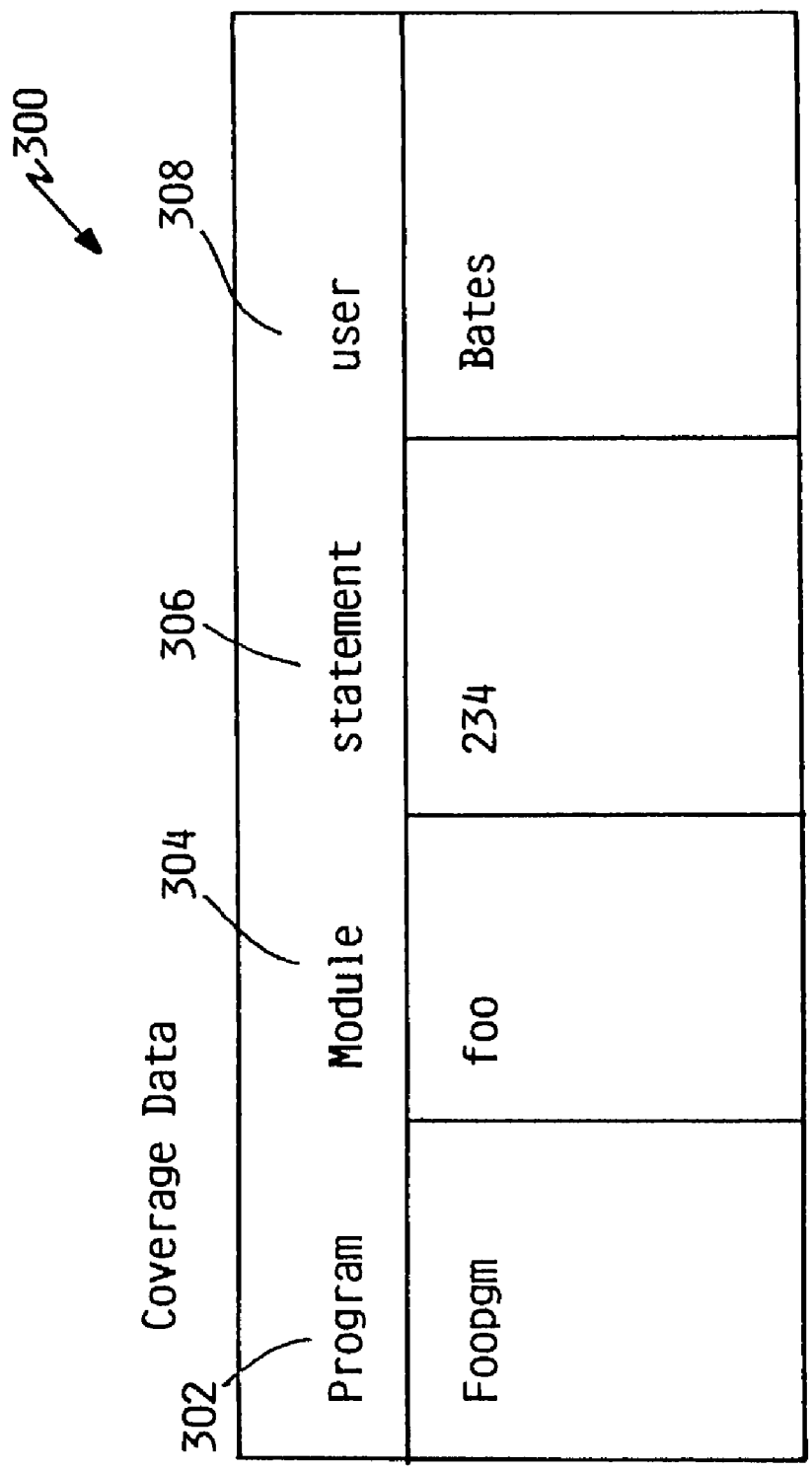
FIG. 3 is a data structure containing coverage data.

Referring now to FIG. 3, a table 300 contained in the coverage data database 160 is shown, The table 300 comprises a program column 302, a module column 304, a statement column 306 and a user column 308. For a given record, the entries in the program column 302, module column 304 and statement column 306 contain a program name, a module name and a statement number, respectively. The entries in the user column 308 contain a name of the user who executed the statement of the identified module and program. It should be understood that the table 300 may contain a variety of other coverage data, which is not shown for simplicity.

Figure 4:
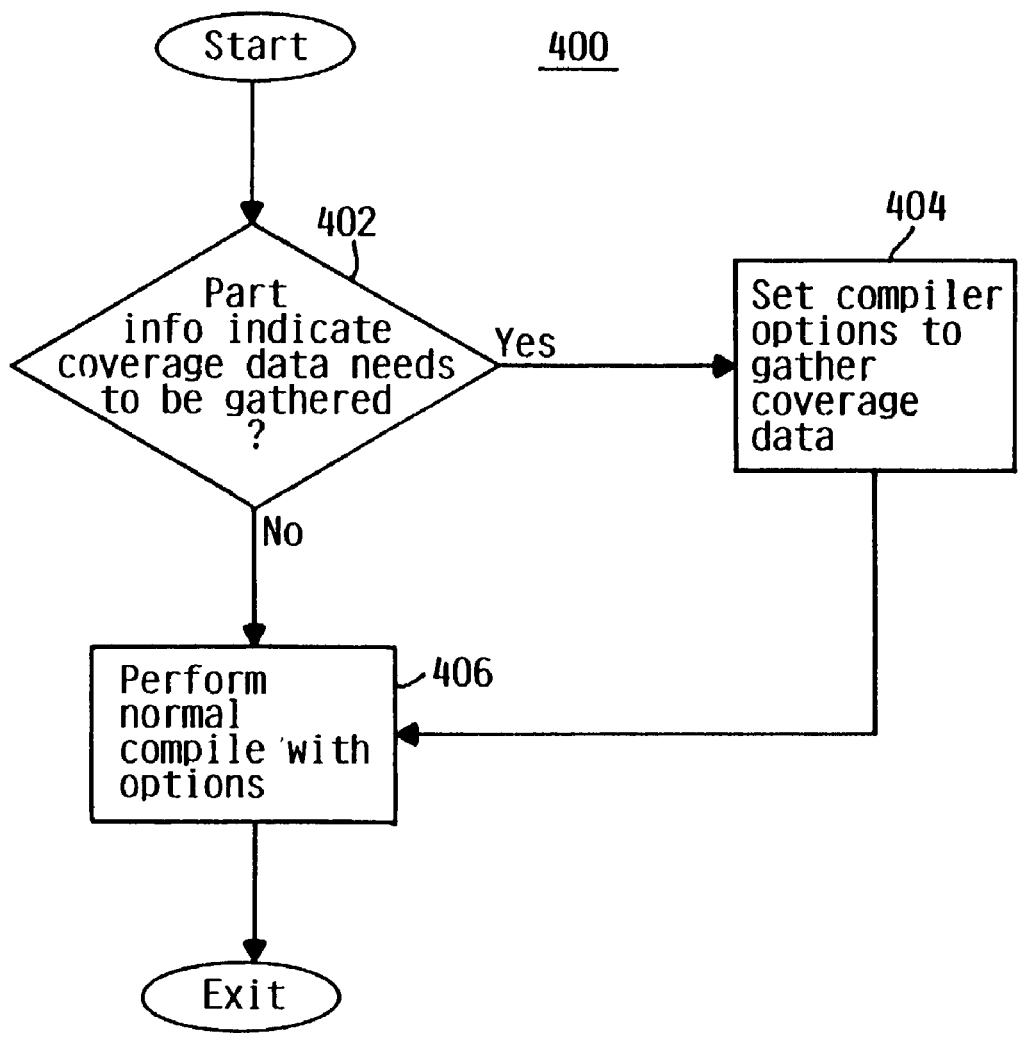
FIG. 4 is a flow chart illustrating the operation of a compiler.

Referring now to FIG. 4, a compilation process 400 for the compiler 122 is shown. At step 402 of the process 400, the compiler 122 determines whether a record in the part information table 158 indicates that coverage data is to be collected for the part being compiled. That is, the compiler 122 determines the value of the field in the coverage column 206 of the record for the part being compiled. If coverage data is to be collected, compiler options are set at step 404 to gather coverage data. In any event, the part is compiled at step 406.

Figure 5:
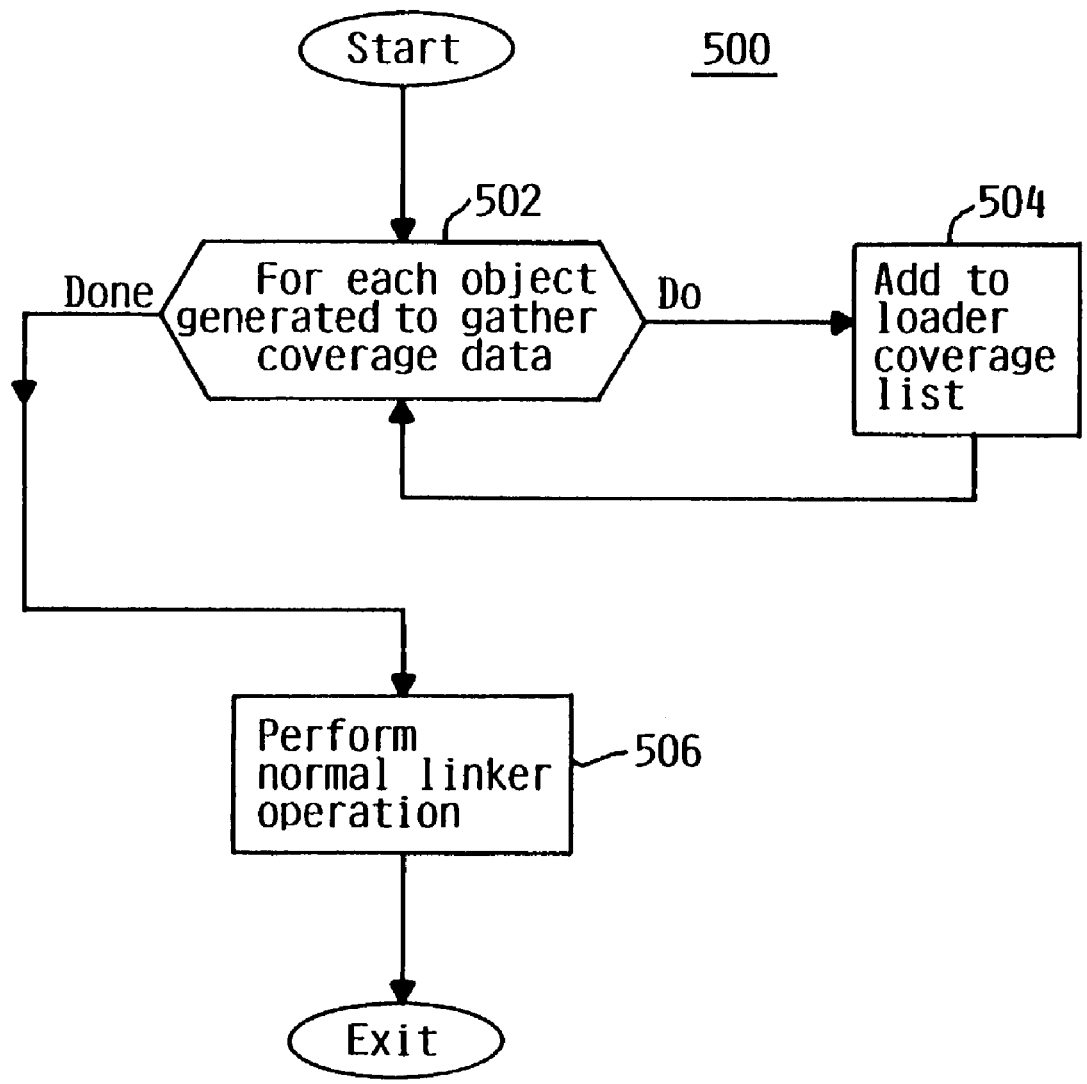
FIG. 5 is a flow chart illustrating the operation of a linker.

The compilation process 400 performed for multiple parts typically generates a plurality of object files 154. These object files 154 are then linked (also referred to as binding) by the linker 124. An illustrative linking process 500 is shown in FIG. 5. The linking process 500 is entered at step 502 where a process is performed for each object file generated to gather coverage data. For each such object, an entry is added to a loader coverage list 157 (shown in FIG. 1, as part of each program) at step 504. Once an entry for each object has been added to the loader coverage list 157, normal linking operations are performed at step 506.

Figure 6:
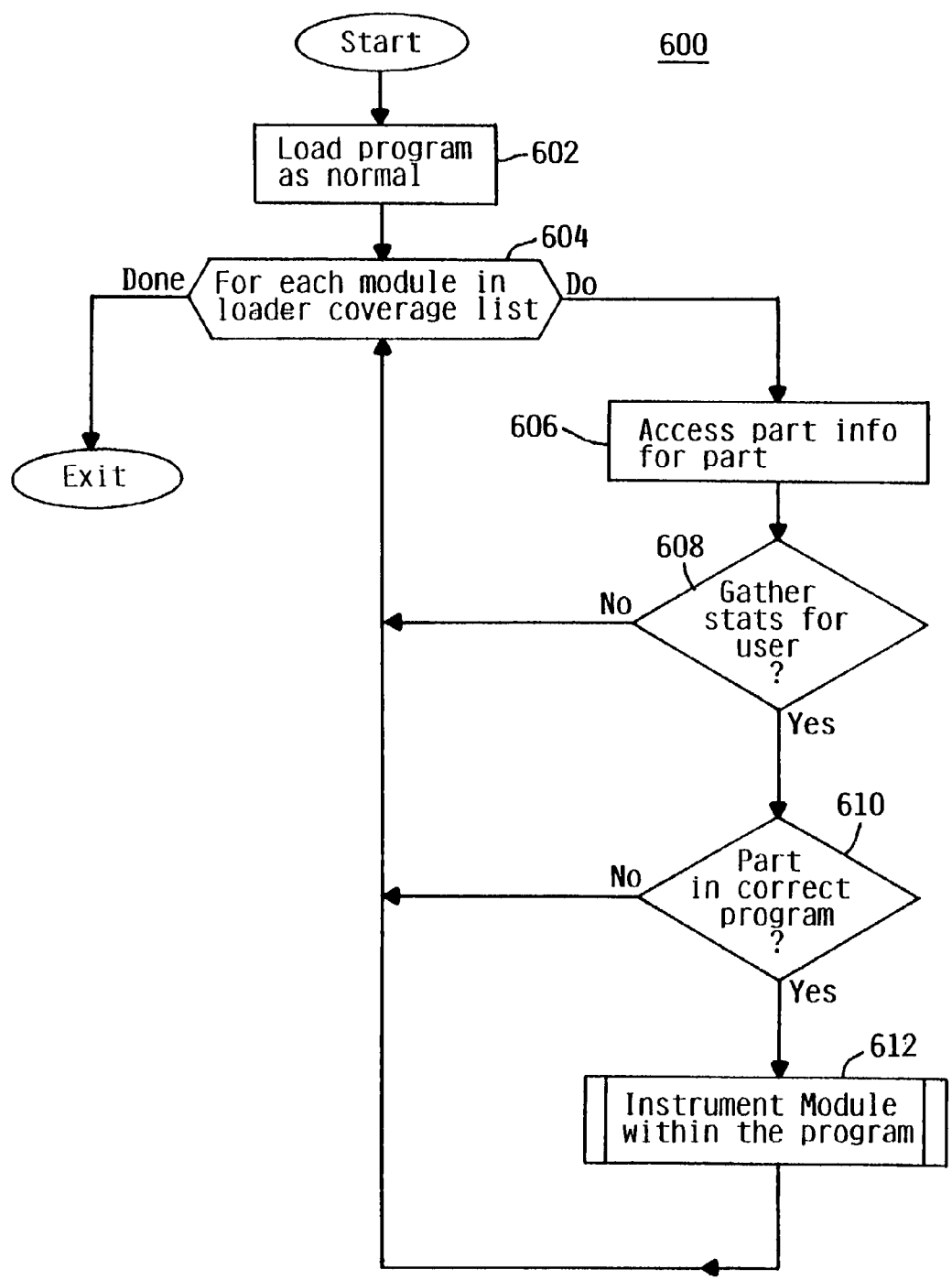
FIG. 6 is a flow chart illustrating the operation of a loader.

Once the various objects have been linked to create a complete program (e.g., one of the programs 156), the program may be loaded into memory 116 by the loader 119. A method 600 illustrating the operation of the loader 119 is shown in FIG. 6. At step 602 the program is loaded into memory as normal. At step 604, a loop is initiated for each module in the loader coverage list. Initially, the loader 119 accesses (at step 606) the part information for the relevant part in the part information table 200. The loader 119 then determines (at step 608) whether the part information table 200 indicates that coverage data should be collected for the present user, as indicated by the appropriate entry of the users column 212. If the part information table 200 indicates that coverage data should not be collected for the present user, the loader 119 begins processing the next module in the loader coverage list. However, if the part information table 200 indicates that coverage data should be collected for the present user, the loader 119 determines whether the part is in a program specified in the associated in record entry of the program column 210 of the part information table 200. If not, the loader 119 begins processing the next module in the loader coverage list. Otherwise, the present module is instrumented at step 612, after which the loader 119 begins processing the next module in the loader coverage list. Once all the modules in the loader coverage list have been processed by the loader 119, the method 600 exits, at which time the program may be executed.

It should be understood that the loader 119 may perform additional processing not shown in FIG. 6. For example, it may not be desirable to collect coverage data during a debugging session (i.e., when the debugger program 130 is active). Accordingly, the process 600 may avoid step 612 (at which a module is instrumented) if the debugger 130 is active. Further, in other embodiments the loader 119 is not needed. For example, the invention may be implemented on an eServer iSeries computer available from International Business Machines, Inc. of Armonk, N.Y. The eServer iSeries computer is a single level store in which executable content is always resident in memory. Accordingly, on such single level store systems, a loader may not be needed.

Figure 7:
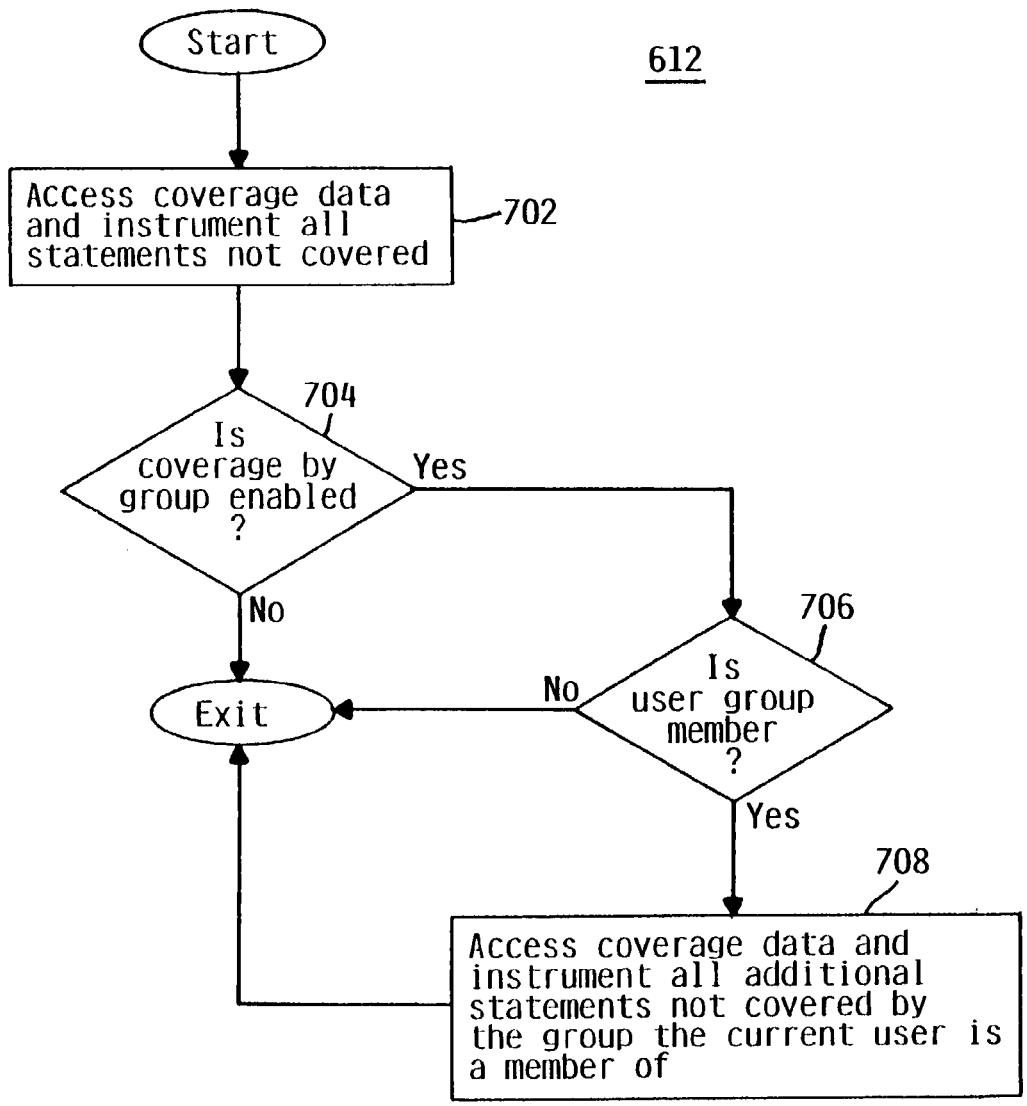
FIG. 7 is a flow chart illustrating the instrumentation of a module.

Referring now to FIG. 7, one embodiment of the step 612 is shown. At step 702 the coverage data table 300 in the database 160 is accessed and all statements not covered (i.e., for which no coverage data exists) are instrumented. Instrumenting code generally involves replacing opcodes at the beginning of each statement such that when the statement is executed a trap occurs. At step 704, the loader 119 accesses the part information table 200 (specifically the groups column 208) to determine whether coverage by groups is enabled. If not, the loader 119 exits and the program is ready for execution. Otherwise, if coverage by groups is enabled, processing proceeds to step 706 to determine whether the present user is a group member of any group(s). If the present user is a group member, the coverage data table 300 in the database 160 is accessed again and all additional statements not covered by the group the current user is a member of are instrumented. The loader 119 then exits.

Figure 8:
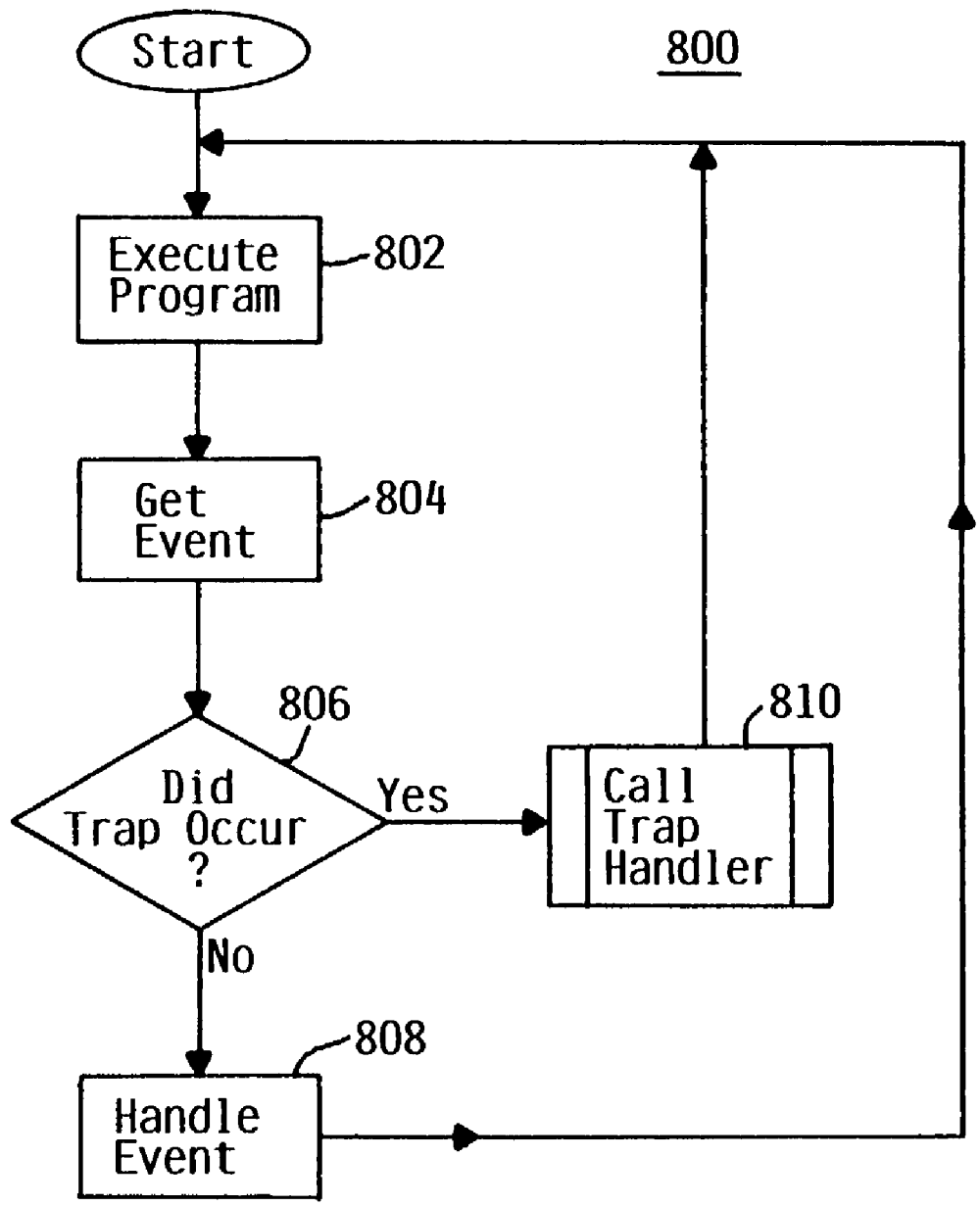
FIG. 8 is a flow chart illustrating the execution of a program.

An illustrative method 800 illustrating processing occurring during execution of a program is shown in FIG. 8. At step 802, the program is shown executing. Execution continues until an event occurs at step 804, after which the method 800 queries (at step 806) whether a trap (set during instrumentation) was encountered for a particular statement. If not, the event is handled at step 808. Otherwise, a trap handler is called at step 810.

Figure 9:
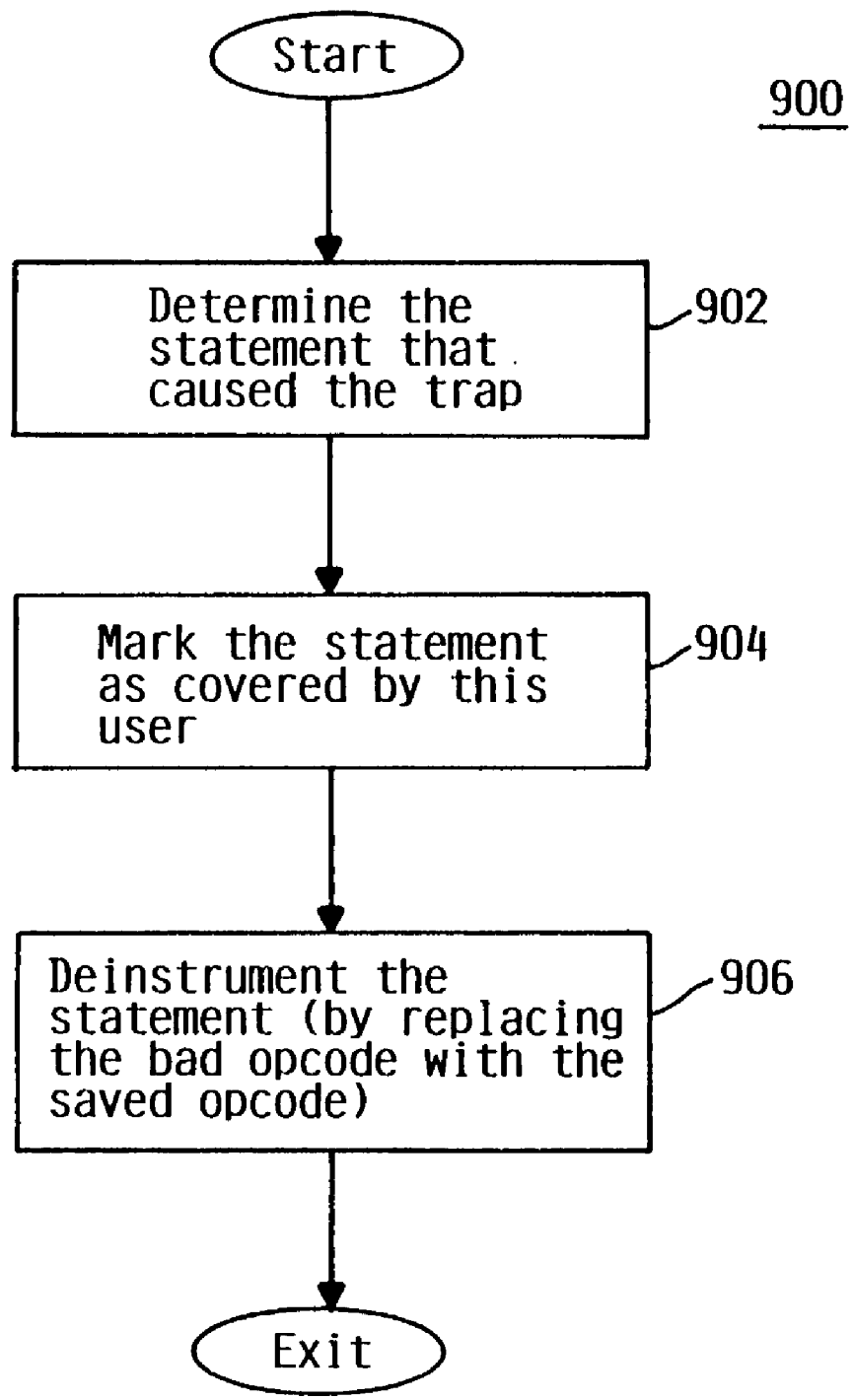
FIG. 9 is a flow chart illustrating the operation of a trap handler.

An illustrative trap handler routine 900 is shown in FIG. 9. The routine 900 is entered when a trap handler is called at step 810 of FIG. 8. At step 902 of the routine 900 the trap handler determines the statement that caused a trap. At step 904 the statement is marked (in the coverage data table 300) as having been covered by the present user. In addition, other coverage data may be collected and stored to the coverage data database 160 at step 904. At step 906, the statement is deinstrumented by replacing the bad opcode (which causes the trap handler to be called) with the original saved opcode.

Figure 10:
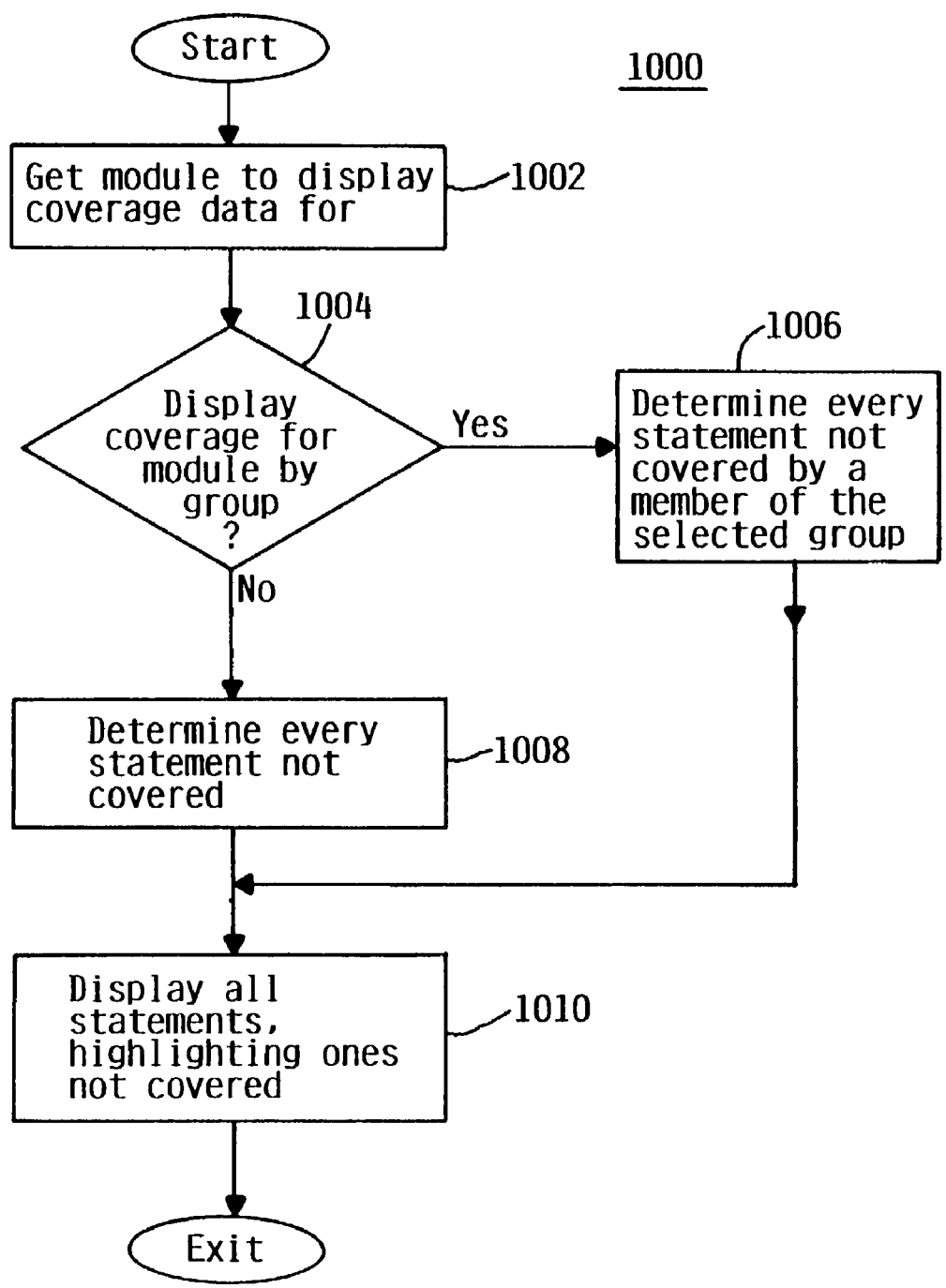
FIG. 10 is a flow chart illustrating the operation of a coverage tool.

In order to obtain the coverage data for a particular module, a user invokes the coverage tool 126. A method 1000 illustrating the operation of the coverage tool is shown in FIG. 10. At step 1002, the coverage tool 126 receives a user request to display coverage data for a particular module. At step 1004, the method 1000 determines whether the user has requested to display coverage data for a particular group. If so, the method 1000 determines every statement not covered by a member of the selected group at step 1006. At step 1010, the code coverage tool 126 displays all the statements of the module, highlighting the statements not covered by any member of the group. Alternatively, if step 1004 is answered negatively, the method 1000 proceeds to step 1008 and determines every statement not covered by any user. Those statements are then displayed to the user at step 1010.

Some aspects of the invention have been described in the context of a group development environment in which development and testing is done using an IDE (such as the IDE 120 shown in FIG. 1). However, the invention is limited neither to a group development environment nor to an IDE. Accordingly, in one embodiment, the invention is implemented in a single user environment, with or without an IDE. In such single user environments, the databases shown residing on the remote system 146$_N$ may reside locally on the computer system 110 (e.g., in storage 138).

The foregoing embodiments are merely illustrative and persons skilled in the art will recognize that the invention may be implemented differently while achieving the same or similar result. For example, in one embodiment, the compiler accesses the coverage data within the IDE and produces a module table within the module being compiled. The module table indicates which statements with in the module have not been covered at the time the module was compiled. The information contained in the module table is a collected by the linker, which places the information in a program table for the resulting program. In one embodiment, a loader is called to load the program into memory. Alternatively, in systems where a loader is not used, a runtime routine is called upon entry to the program. In either case, the loader and the runtime routine access the program table and instruments only those statements which have not been covered, as specified by the program table. When an instrumented statement is hit during execution, trap handling code is called to store the relevant coverage data to memory. When the program exits, the coverage data stored in memory may be sent to the IDE. Within the IDE, a developer can then access the coverage data to determine which statements have been covered.

While the foregoing is directed to embodiments of the present invention, other and further embodiments of the invention may be devised without departing from the basic scope thereof, and the scope thereof is determined by the claims that follow.

What is claimed is:

1. A method of gathering coverage data for a code portion, comprising:
    selecting the code portion for which coverage data is to be gathered;
    storing a coverage requirement for the code portion which, when compiled, becomes part of a module that includes the code portion, wherein the coverage requirement specifies that coverage data is collected whenever the code portion is executed by at least one of (i) a particular user and (ii) a particular program that includes the module; and
    when compiling the code portion, determining whether coverage data has been gathered for the code portion, according to the coverage requirement; and
    if not, compiling the code portion to generate the module, wherein the module is configured with instrumentation settings such that when the module is instrumented, coverage data will be gathered for the module when the module is subsequently executed.

2. The method of claim 1, wherein the module is accessible to a plurality of users via an integrated development environment.

3. The method of claim 1, further comprising instrumenting the module.

4. The method of claim 3, wherein instrumenting the module comprises instrumenting only those statements, in the code portion, of the module for which no coverage data has been collected, according to the coverage requirement.

5. The method of claim 3, wherein instrumenting the module comprises one of:
    accessing coverage data at runtime; and
    accessing coverage data when compiling the code portion and generating a table containing information specifying for which statements of the module no coverage data exists.

6. The method of claim 3, wherein instrumenting the module comprises instrumenting only those statements of the module for which no coverage data has been collected by a defined group of users.

7. The method of claim 3, wherein instrumenting the module comprises, replacing a first executable instruction, corresponding to the code portion, with a second executable instruction which, when executed, causes the coverage data to be gathered; and further comprising, after executing the second executable instruction, restoring the first executable instruction in the module, so that the coverage data will not be gathered during a subsequent execution of the module.

8. A method of collecting coverage data for a code portion which, when compiled and linked, becomes a module of a program, the method comprising:
    configuring the code portion with an instrumentation setting such that when the module is instrumented coverage data will be gathered for the module, wherein the instrumentation setting specifies a coverage requirement for the code portion indicates at least one of (i) that coverage data is to be collected for the code portion only when the module is executed as part of a particular program and (ii) that coverage data is to be collected for the code portion only when the module is executed by one or more particular users;
    instrumenting the code portion according to the instrumentation settings and only for those statements for which no coverage data has been gathered previously; and
    collecting coverage data each time an instance of the module is executed.

9. The method of claim 8, wherein the module is accessible to a plurality of users via an integrated development environment.

10. The method of claim 8, wherein configuring the code portion with instrumentation settings comprises compiling the code portion.

11. The method of claim 8, further comprising, prior to configuring the code portion, storing a coverage requirement for the code portion, wherein the coverage requirement indicates that coverage data is to be collected for the code portion each time an instance of the module is executed.

12. A computer readable medium containing a program which, when executed, performs an operation for gathering coverage data for a code portion comprising:
    selecting the code portion for which coverage data is to be gathered;
    storing a coverage requirement for the code portion which, when compiled, becomes part of a module that includes the code portion, wherein the coverage requirement specifies that coverage data is collected whenever the code portion is executed by at least one of (i) a particular user and (ii) a particular program that includes the module; and when compiling the code portion, determining whether coverage data has been gathered for the code portion, according to the coverage requirement; and if not, compiling the code portion to generate the module, wherein the module is configured with instrumentation settings such that when the module is instrumented, coverage data will be gathered for the module when the module is subsequently executed.

13. The computer readable medium of claim 12, wherein the program is part of an integrated development environment.

14. The computer readable medium of claim 12, further comprising instrumenting the module.

15. The computer readable medium of claim 14, wherein instrumenting the module comprises instrumenting only those statements of the module for which no coverage data has been collected.

16. The computer readable medium of claim 14, wherein instrumenting the module comprises one of:
accessing coverage data at runtime; and
accessing coverage data when compiling the code portion and generating a table containing information specifying for which statements of the module no coverage data exists.

17. The computer readable medium of claim 14, wherein instrumenting the module comprises instrumenting only those statements of the module for which no coverage data has been collected by a defined group of users.

18. The computer readable medium of claim 14, wherein instrumenting the module comprises, replacing a first executable instruction, corresponding to the code portion, with a second executable instruction which, when executed, causes the coverage data to be gathered; and further comprising, after executing the second executable instruction, restoring the first executable instruction in the module, so that the coverage data will not be gathered during a subsequent execution of the module.

19. A computer readable medium containing a program which, when executed, performs an operation of collecting coverage data for a code portion which, when compiled and linked, becomes a module of a program, the operation comprising:
configuring the code portion with an instrumentation settings such that when the module is instrumented coverage data will be gathered for the module, wherein the instrumentation setting specifies a coverage requirement for the code portion indicates at least one of (i) that coverage data is to be collected for the code portion only when the module is executed as part of a particular program and (ii) that coverage data is to be collected for the code portion only when the module is executed by one or more particular users;
instrumenting the code portion according to the instrumentation settings and only for those statements for which no coverage data has been gathered previously; and
collecting coverage data each time an instance of the module is executed.

20. The computer readable medium of claim 19, wherein the module is accessible to a plurality of users via an integrated development environment.

21. The computer readable medium of claim 19, wherein configuring the code portion with instrumentation settings comprises compiling the code portion.

22. The computer readable medium of claim 19, further comprising, prior to configuring the code portion, storing a coverage requirement for the code portion, wherein the coverage requirement indicates that coverage data is to be collected for the code portion each time an instance of the module is executed.

* * * * *